(12) United States Patent
Pyter

(10) Patent No.: US 10,820,569 B2
(45) Date of Patent: Nov. 3, 2020

(54) PET BOWL CLEAN UP DEVICE AND METHOD

(71) Applicant: Christopher Pyter, Chicago, IL (US)

(72) Inventor: Christopher Pyter, Chicago, IL (US)

(*) Notice: Subject to any disclaimer, the term of this patent is extended or adjusted under 35 U.S.C. 154(b) by 157 days.

(21) Appl. No.: 16/199,162

(22) Filed: Nov. 24, 2018

(65) Prior Publication Data

US 2019/0159426 A1 May 30, 2019

Related U.S. Application Data

(60) Provisional application No. 62/590,376, filed on Nov. 24, 2017.

(51) Int. Cl.
| | | |
|---|---|---|
| *A01K 5/01* | (2006.01) | |
| *A01K 5/00* | (2006.01) | |
| *A01K 7/00* | (2006.01) | |

(52) U.S. Cl.
CPC ............ *A01K 5/0135* (2013.01); *A01K 7/005* (2013.01)

(58) Field of Classification Search
CPC .. A01K 5/0114; A01K 5/0135; A01K 5/0142; A01K 7/00; A01K 7/027; A01K 5/0121; A01K 5/0128; A01K 7/005
USPC .......... 119/61.5, 61.53, 61.52, 61.54, 51.01, 119/61.57, 63, 72, 73; D30/129
See application file for complete search history.

(56) References Cited

U.S. PATENT DOCUMENTS

| | | | | |
|---|---|---|---|---|
| 2,352,684 A | * | 7/1944 | Braddock | A47G 23/06 220/23.6 |
| 3,698,594 A | * | 10/1972 | Boehlert | A47G 19/03 220/495.01 |
| D304,658 S | * | 11/1989 | Mattei | D7/505 |
| 4,886,016 A | * | 12/1989 | Atchley | A01K 5/0135 119/61.54 |
| 5,069,166 A | * | 12/1991 | Ahuna | A01K 5/0142 119/61.53 |
| 5,113,798 A | * | 5/1992 | Rera | A01K 5/0142 119/51.5 |
| D360,112 S | * | 7/1995 | McEntee | D7/545 |
| 5,560,316 A | * | 10/1996 | Lillelund | A01K 5/0114 119/61.5 |
| 5,647,299 A | * | 7/1997 | Pearson-Falcon | A01K 5/0142 119/61.53 |
| D399,029 S | * | 9/1998 | Falcone | D30/130 |
| 5,869,120 A | * | 2/1999 | Blazevich | A47G 19/02 426/112 |
| 6,230,653 B1 | * | 5/2001 | Tobin | A01K 7/00 119/72 |
| D444,676 S | * | 7/2001 | Murphy | D7/553.6 |
| 6,516,747 B1 | * | 2/2003 | Willinger | A01K 5/0114 119/61.54 |
| 6,672,248 B2 | * | 1/2004 | Bourigault | A01K 5/0114 119/51.01 |

(Continued)

*Primary Examiner* — Yvonne R Abbott-Lewis
(74) *Attorney, Agent, or Firm* — McDonnell Boehnen Hulbert & Berghoff LLP

(57) ABSTRACT

The present disclosure relates generally to a pet bowl clean up device for attaching to a pet bowl. The present disclosure relates more particularly to a clean up device including a skirt and a ring. The skirt is configured to retain a solid substance and includes an inner edge configured to attach to a top portion of the bowl, an outer portion, and a flexible central portion extending along a length between the inner edge and the outer portion of the skirt. The ring is attached to the outer portion of the skirt.

20 Claims, 5 Drawing Sheets

(56) References Cited

U.S. PATENT DOCUMENTS

| | | | | |
|---|---|---|---|---|
| D587,529 S | * | 3/2009 | Pratt | D7/553.8 |
| 7,934,449 B2 | * | 5/2011 | Anderson | B65D 1/36 |
| | | | | 206/508 |
| 8,464,658 B2 | * | 6/2013 | Lanter | A01K 5/0114 |
| | | | | 119/61.52 |
| 8,683,951 B2 | * | 4/2014 | Linke | A01K 5/0142 |
| | | | | 119/61.5 |
| 9,066,511 B2 | * | 6/2015 | McKnight | A01M 1/026 |
| D739,615 S | * | 9/2015 | Robertson | D30/129 |
| D750,939 S | * | 3/2016 | Kellow, Jr. | D7/557 |
| 2005/0056226 A1 | * | 3/2005 | Ruggiero, Jr. | A01K 5/0135 |
| | | | | 119/61.52 |
| 2008/0029037 A1 | * | 2/2008 | Ogata | A01M 29/34 |
| | | | | 119/61.53 |
| 2010/0170447 A1 | * | 7/2010 | Pridgen, Jr. | A01K 5/0128 |
| | | | | 119/61.53 |
| 2010/0313815 A1 | * | 12/2010 | Maeda | A01K 7/00 |
| | | | | 119/61.52 |

\* cited by examiner

PET BOWL CLEAN UP DEVICE AND METHOD

CROSS-REFERENCE TO RELATED APPLICATIONS

This application claims priority to U.S. Provisional Patent Application No. 62/590,376, filed Nov. 24, 2017, which is incorporated herein by reference in its entirety and for all purposes.

FIELD

The present disclosure relates generally to a pet bowl clean up device and method.

BACKGROUND

Pet bowls allow for feeding pets. Such pet bowls are generally shallow bowls able to contain pet food and/or water. When a pet eats or drinks out of such bowls, the pet may spill pet food or water onto the surrounding surface, requiring clean up. Additionally, any spilled pet food and water is often thrown away as waste.

The present inventor has recognized that a retainer device that may be attached to a pet bowl to facilitate clean up would be attractive to pet owners.

SUMMARY

In one aspect, the present disclosure provides a pet bowl device to facilitate clean up, the pet bowl device comprising:
  a bowl comprising:
  a base; and
  a wall comprising a lower portion adjacent to the base and an upper portion distal from the base, wherein the distance from a bottom of the base to a top of the upper portion defines a first height;
  a skirt configured to retain a solid substance, the skirt comprising:
  an inner edge attached to the upper portion of the bowl;
  an outer portion; and
  a central portion extending along a length between the inner edge and the outer portion, wherein the central portion is flexible, and wherein the length of the central portion is substantially greater than the first height of the bowl; and
  a ring coupled to the outer portion of the skirt, wherein the ring is shape retaining, and wherein the ring is a second height.

In another aspect, the disclosure provides a pet bowl clean up method, the method comprising:
  positioning a pet bowl device in a first configuration, wherein the pet bowl device is configured to retain a solid substance, and wherein the pet bowl device comprises:
  a bowl comprising:
  a base; and
  a wall comprising a lower portion adjacent to the base and an upper portion distal from the base, wherein the distance from a bottom of the base to a top of upper portion defines a first height;
  a skirt configured to retain a solid substance, the skirt comprising:
  an inner edge attached to the upper portion of the bowl;
  an outer portion; and
  a central portion extending along a length between the inner edge and the outer portion, wherein the central portion is flexible, and wherein the length of the central portion is substantially greater than the first height of the bowl; and
  a ring coupled to the outer portion of the skirt, wherein the ring is shape retaining, and wherein the ring is a second height;
  and wherein in the first configuration, a bottom portion of the bowl and a bottom portion of the ring are on a surface; and
  moving the pet bowl device to a second configuration, wherein, in the second configuration, a top of the ring is above the top of the bowl; and so as to deposit the solid substance from the skirt into the bowl.

In another aspect, the disclosure provides a pet bowl clean up device, the device comprising:
  a skirt configured to retain a solid substance, the skirt comprising:
  an inner edge configured to attach to an upper portion of a bowl;
  an outer portion; and
  a central portion extending along a length between the inner edge and the outer portion, wherein the central portion is flexible, and wherein the length of the central portion is substantially greater than a first height of the bowl; and
  a ring coupled to the outer portion of the skirt, wherein the ring is shape retaining, and wherein the ring is a second height.

Other aspects, embodiments, and implementations will become apparent to those of ordinary skill in the art by reading the following detailed description, with reference where appropriate to the accompanying drawings.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As described above, the present inventor has noted that conventional pet bowls require time consuming clean up methods and can be wasteful. Accordingly, one aspect of the disclosure is a pet bowl clean up device for attaching to a pet bowl. The pet bowl clean up device includes a skirt configured to attach to the bowl and a ring attached to the skirt. The skirt is formed of a flexible material, is configured to retain solid substances, such as pet food, and attaches to the bowl at an upper portion of the bowl. The ring is shape retaining and attaches to an outer portion of the skirt. In use, the ring may be lifted above the bowl such that any food that has spilled out of the bowl onto the skirt, may be deposited into the bowl.

Figure 1A:
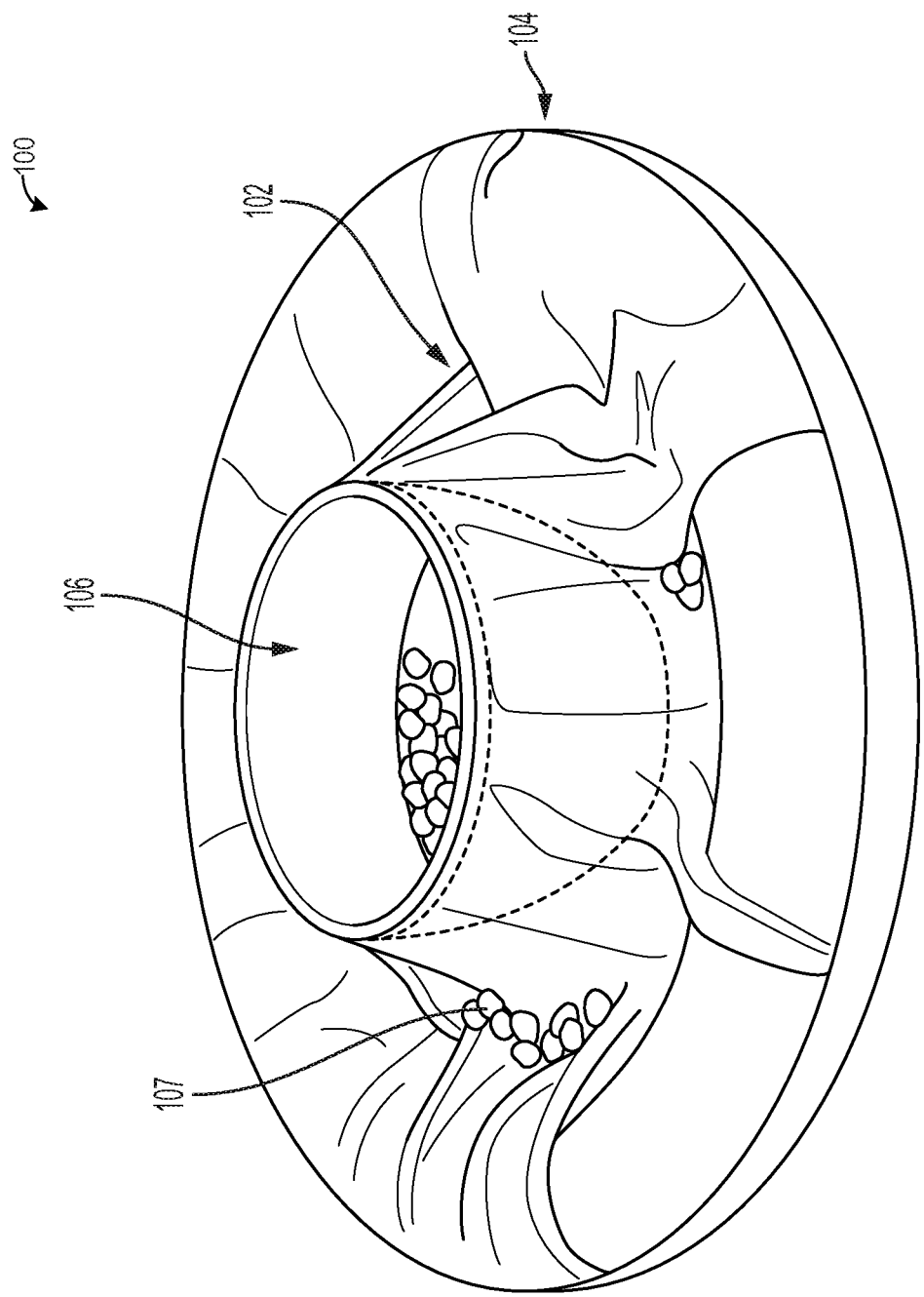
FIG. 1A is a schematic perspective view of a pet bowl device in accordance with an embodiment of the disclosure.

Such a pet bowl clean up device is shown in perspective view in FIG. 1A in a first configuration. The pet bowl clean up device 100 includes a bowl 106, a skirt 102 attached to the bowl 106, and a ring 104 attached to the skirt 102. Further, in the first configuration, a base 140 of the bowl and a bottom portion of the ring may be resting a surface.

In certain embodiments, the bowl 106 and the skirt 102 are configured to retain solid substances 107 (e.g., pet food). An inner edge of the skirt 102 is configured to attach to an upper portion of the bowl 106. Additionally, an outer portion of the skirt 102 may be attached to the ring 104.

Figure 1B:
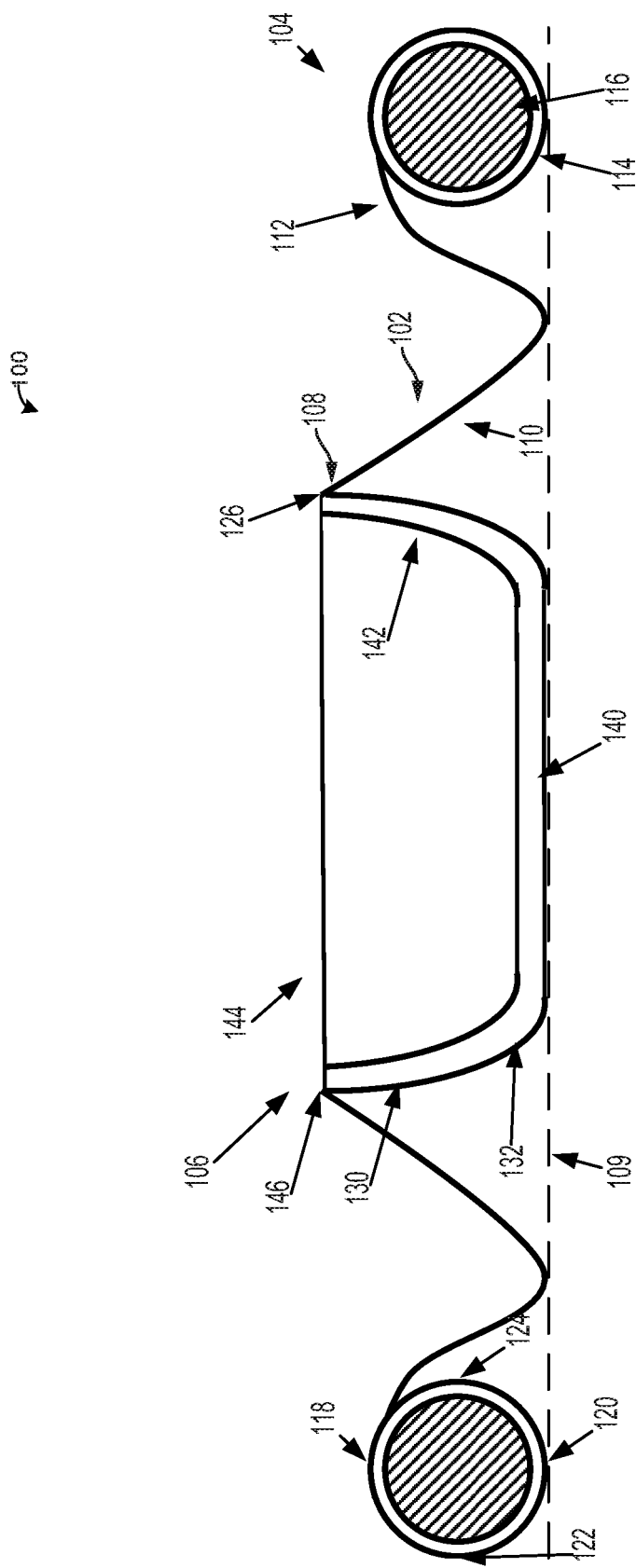
FIG. 1B is a cross-sectional elevation view of a pet bowl device in accordance with embodiment of the disclosure.

FIG. 1B illustrates a pet bowl clean up device in a cross-sectional elevation view in the first configuration. The pet bowl clean up device 100 includes a bowl 106, a skirt 102 attached to the bowl 106, and a ring 104 attached to the skirt 102. The bowl 106 is configured to retain solid substances 107 (e.g., pet food) and includes a base 140, wall 142, and at least one receptacle 144. Additionally, in some embodiments, the bowl 106 may be configured to retain liquid substances. The wall 142 includes a lower portion 132 adjacent to the base 140 and an upper portion 130 distal from the base 140. Further, the distance from the base 140 of the bowl 106 to a top 146 of the upper portion 130 of the wall 142 defines a first height.

The base 140 of the bowl 106 is substantially flat, such that the bowl 106 will balance when resting on the surface 109 (e.g., a floor). In some examples, the base 140 may be substantially circular. In other examples, the base 140 may be substantially rectangular. Many embodiments and examples are possible.

In certain embodiments, the wall 142 may be curved between the lower portion 132 and the upper portion 130. In some embodiments, the curve may be concave. In other example embodiments, the curve may be convex. Alternatively, in different example embodiments, the wall 142 may be substantially vertical. Many other example embodiments are possible.

In certain embodiments, the bowl 106 may comprise a single receptacle 144. In alternative embodiments, the bowl 106 may comprise multiple receptacles 144. For example, two receptacles 144 may be adjacent to one another in the bowl 106.

The bowl 106 may be formed of a variety of shape retaining materials. In certain embodiments, the bowl 106 may be formed of a rigid material, such as metal or porcelain. In other embodiments, the bowl 106 may be formed of a polymer (e.g., silicone). Many examples are possible.

In some embodiments, the bowl 106 is permanently affixed to an inner edge 108 of the skirt 102. In alternative embodiments, the skirt 102 and the ring may be detachable from the bowl 106. In such embodiments, the bowl 106 may include a groove near the upper portion 130 configured to receive an inner edge 108 of the skirt 102.

The skirt 102 is configured to retain solid substances 107 (e.g., pet food) and includes an inner edge 108 coupled to the bowl 106, an outer portion 112 coupled to the ring 104, and a central portion 110 extending along a length between the inner edge 108 and the outer portion 112.

In certain embodiments, the inner edge 108 may comprise an elastic band 126. The elastic band 126 may be a rubber band or it may be a single loop of elastic material, such as a flexible polymer. The elastic band 126 is configured to frictionally attach to the upper portion 130 of the bowl 106. In some embodiments, the upper portion 130 of the bowl 106 may include a groove configured to receive and retain the elastic band 126. The circumference of the elastic band 126 when in a relaxed (i.e., an unstretched state) is smaller than the groove on the upper portion 130 of the bowl. Further, in some embodiments, the circumference of the elastic band 126 may be adjustable.

Additionally or alternatively, the inner edge 108 of the skirt 102 may be formed of a flexible, shape-retaining material (e.g., silicone). In some embodiments, the inner edge 108 may be may be positioned around the upper portion 130 of the bowl 106. In these example embodiments, the inner edge 108 may be approximately the same circumference, or slightly smaller, as the circumference of the upper portion 130 of the bowl 106 such that the inner edge 108 may be stretched around the upper portion 130 of the bowl 106 and remain affixed to the bowl 106. In some embodiments, the upper portion 130 of the bowl 106 may include a groove configured to receive and retain the inner edge 108.

In certain embodiments, the inner edge 108 may be permanently affixed to the upper portion 130 of the bowl 106. For example, the bowl 106, the ring 104, and the skirt 102 may be integrally formed. In other example embodiments, the inner edge 108 may be permanently affixed to the upper portion 130 of the bowl 106 by way of an adhesive (e.g., glue). In yet another example embodiment, the inner edge 108 may be affixed to the upper portion 130 of the bowl 106 by way of mechanical fasteners (e.g., buttons).

The central portion 110 of the skirt 102 extends along a length between the inner edge 108 and the outer portion 112. In some examples, the length of the central portion 110 may be substantially greater than the first height 136 of the bowl 106. For example, the length of the central portion 110 may be 30%-70% greater than the height of the bowl 106. As such, the length of the central portion 110 of the skirt 102 may differ in various embodiments depending on the size of the bowl 106. For example, for a bowl 106 having a height of 3 inches from the base 140 to the top 146, the central portion 110 of the skirt 102 may be 3.9-5.4 inches. Many variations of skirt 102 size are possible.

In certain embodiments, the central portion 110 of the skirt 102 is formed of a flexible material (e.g., fabric) such that the central portion 110 drapes between the inner edge 108 and the outer portion 112. This allows the central portion 110 to catch and retain any solid substance 107 that has spilled out of the bowl 106 (e.g., a pet spills food outside of the bowl 106 onto the skirt 102 while eating). Further, in some examples, the skirt 102 may be a single piece of material. Alternatively, in other examples, the skirt 102 may be composed of multiple pieces that are attached together to form a single skirt 102.

In certain embodiments, the central portion 110 of the skirt 102 may be formed from a flexible polymer (e.g., silicone). Additionally or alternatively, in some embodiments, the skirt 102 and the ring 104 may be integrally formed. In some examples, the composition of the silicone in the inner edge 108 of the skirt may be more elastic than the composition of the silicone in the ring 104, which may be more rigid. Alternatively, in different embodiments, the composition of the silicone may be uniform throughout the skirt 102 and the ring 104.

Similarly, in some other examples, the bowl 106, the ring 104, and the skirt 102 may be integrally formed from a flexible polymer (e.g., silicone). In some embodiments, the composition of the silicone may be uniform throughout the bowl 106, the ring 104, and the skirt 102. Alternatively, the composition of silicone may vary throughout the pet bowl device 100. For example, the composition of the silicone in the central portion 110 of the skirt 102 may be more flexible than the composition of the silicone in the ring 104 and the bowl 106.

In certain embodiments, the central portion 110 of skirt 102 may be configured to retain liquid substances (e.g., water) in addition to solid substances 107. In these embodiments, the skirt 102 may be formed of material impervious to liquids (i.e., waterproof material), such that if liquid splashes from the bowl 106 onto the skirt 102, the skirt 102 will retain the liquid.

The ring 104 is shape retaining. Further, the distance between a bottom portion 120 of the ring 104 and a top portion 118 of the ring 104 defines a second height. In some embodiments, the ring 104 is substantially circular. Alternatively, in some other embodiments, the ring 104 may be substantially rectangular (e.g., a square). Many other examples are possible.

In some embodiments, the width of the ring 104 from the inner edge 124 to the outer portion 122 may range from about 0.5-4 inches. Similarly, in some example embodiments the height of the ring 104 may be range from about 0.5-4 inches. In certain embodiments, the width of the ring 104 and the height of the ring 104 may be proportional to the size and/or height of the bowl 106. In some examples, the width and height of the ring 104 may be approximately 30%-90% of the height bowl 106. For example, for a bowl 106 having a height of 3 inches from base 140 to top 146, height and width of the ring 104 may be 0.9-2.7 inches. Further, the width and height of the ring 104 may be different from each other. For example, the height of the ring 104 may be 1 inch and the width may be 3 inches. The height to width ratio may be increased to add stability of the ring 104. Many variations of sizes of the ring 104 are possible.

In certain embodiments, the ring 104 may be formed of a rigid material (e.g., metal). In other embodiments, the ring 104 may be formed of semi-rigid material (e.g., rubber). In other embodiments, the ring 104 may be formed of silicone. In yet another embodiment, the ring 104 may be formed of Styrofoam. Additionally or alternatively, the ring 104 may comprise a combination of materials. For example, the ring 104 may comprise rubber on the bottom portion 120 to prevent movement along the surface 109 and comprises a different material in the top portion 118.

In certain embodiments, the ring 104 is disposed within a sleeve 114 formed by the outer portion 112 of the skirt 102. For example, the material in the outer portion 112 of the skirt 102 may wrap around the ring 104, such that the outer portion 112 of the skirt 102 may envelope the ring 104. In other example embodiments, the outer portion 112 of the skirt 102 may attach to the ring 104 by way of an adhesive (e.g., glue). In yet another example embodiment, the outer portion 112 of the skirt 102 may attach to the ring 104 by way of mechanical fasteners (e.g., buttons).

In some embodiments, the cross-section 116 of the ring 104 is substantially circular. In other embodiments, the cross-section 116 of the ring 104 is substantially oval. In another embodiment, the cross-section 116 of the ring 104 may be substantially rectangular. In yet another example, the cross-section 116 of the ring may be semi-circular, such that the bottom portion 120 is flat and the top portion 118 is circular. Many other examples are possible.

Figure 2:
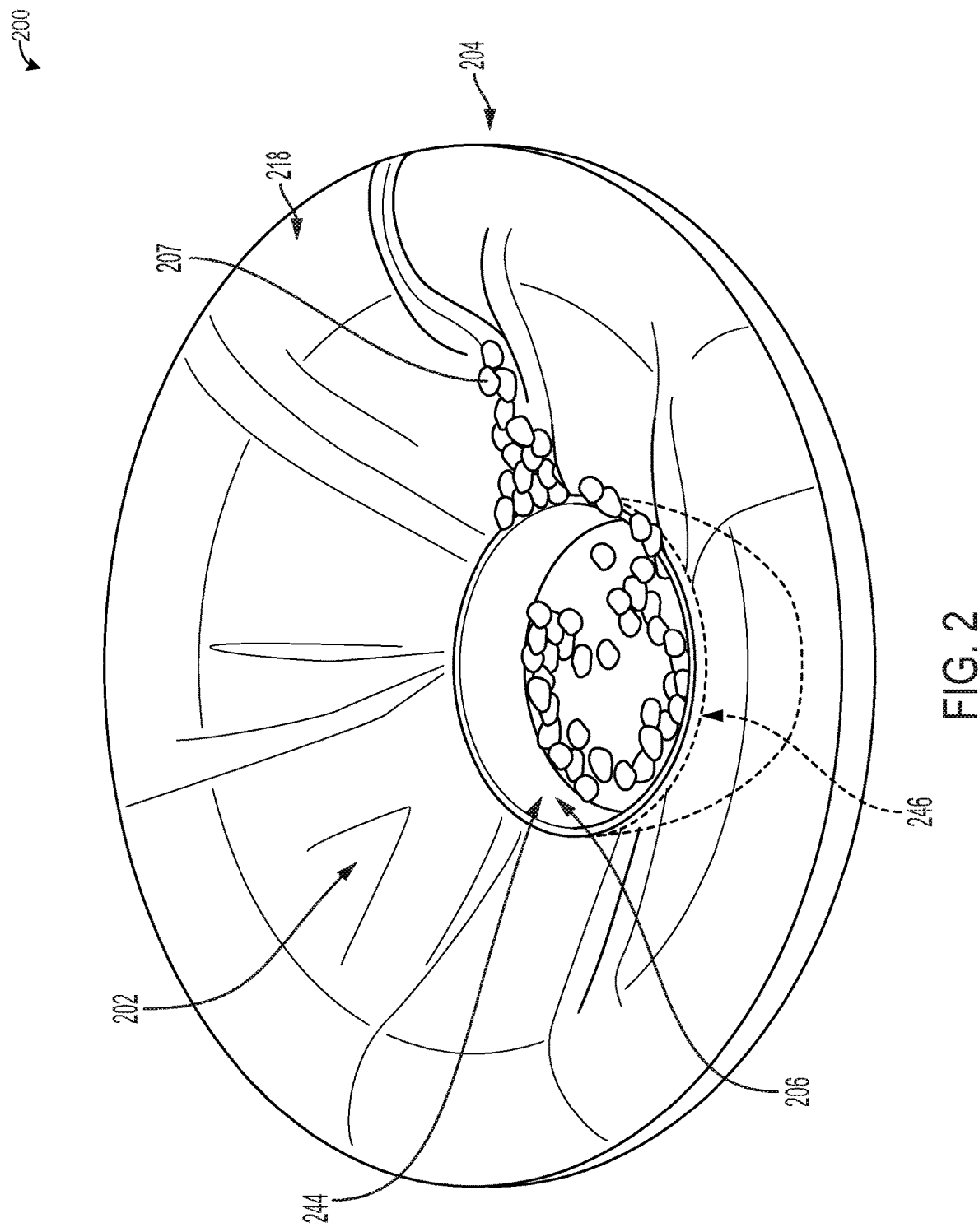
FIG. 2 is a schematic perspective view of a pet bowl device in another configuration according to an embodiment of the disclosure.

FIG. 2 illustrates the pet bowl device 200 in a second configuration. In the second configuration, the top portion 218 of the ring 104 is above the top 246 of the bowl 206, so as to deposit the solid substance 207 from the skirt 202 into the receptacle 244 of the bowl 206.

In certain examples where the skirt 202 is configured to retain a liquid substance, moving the pet bowl device 200 to the second configuration causes the liquid substance to deposit into the receptacle 244 of the bowl 206 from the skirt 102.

Figure 3:
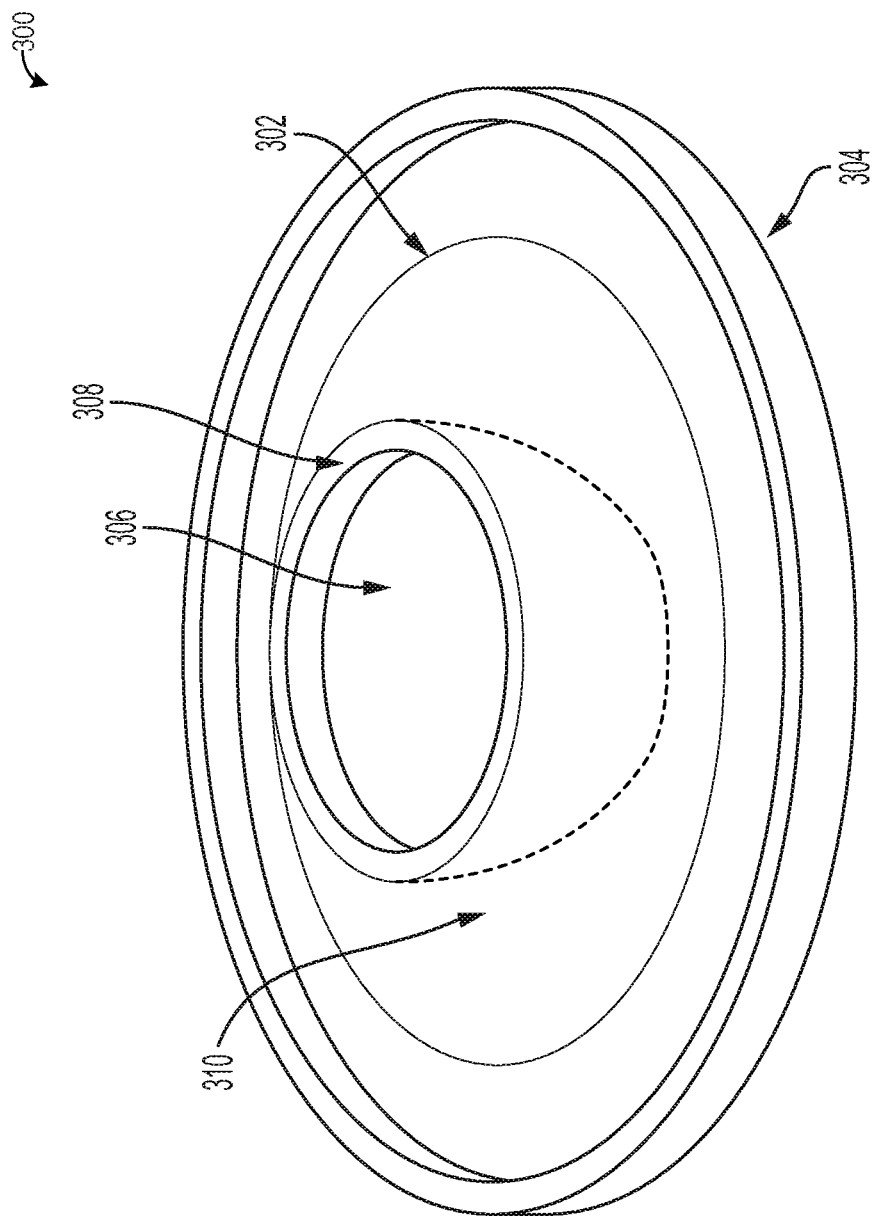
FIG. 3 is a schematic perspective view of a pet bowl device according to another embodiment of the disclosure.

FIG. 3 is a schematic perspective view of the pet bowl device 300 according to another embodiment of the disclosure in an example configuration. In such examples, the ring 304 and the skirt 302 may be integrally formed. Further, in this example configuration, a base of the bowl and a bottom portion of the ring may be resting on a surface.

In certain embodiments, the skirt 302 may be formed from a flexible polymer (e.g., silicone). In some examples, the skirt 302 and the ring 304 may be integrally formed. In some embodiments, the composition of the silicone in the inner edge 308 of the skirt may be more elastic than the composition of the silicone in the ring 304, which may be more rigid. Alternatively, in different embodiments, the composition of the silicone may be uniform throughout the skirt 302 and the ring 304

Similarly, in some other examples, the bowl 306, the ring 304, and the skirt 302 may be integrally formed from a flexible polymer (e.g., silicone). In other examples, the skirt 302 and the skirt 304 may attach to the bowl 306 in a similar fashion to that described above with respect to skirt 102, ring 104, and bowl 106. In some embodiments, the composition of the silicone may be uniform throughout the bowl 306, the ring 304, and the skirt 302. Alternatively, the composition of silicone may vary throughout the pet bowl device 300. For example, the composition of the silicone in the skirt 302 may be more flexible than the composition of the silicone in the ring 304 and the bowl 306, which may be more rigid.

In certain embodiments, the central portion 310 skirt 302 may be configured to retain liquid substances (e.g., water) in addition to solid substances. In these embodiments, the skirt 302 may be formed of material impervious to liquids (i.e., waterproof material), such that if liquid splashes from the bowl 306 onto the skirt 302, the skirt 302 will retain the liquid.

Though aspects and configurations of pet bowl device 300 may differ from pet bowl device 100 and pet bowl device 200 described above with respect to FIG. 1A, FIG. 1B, and FIG. 2, these pet bowl devices may be functionally similarly. For instance, each pet bowl device may operate in accordance with method 400 described below.

Figure 4:
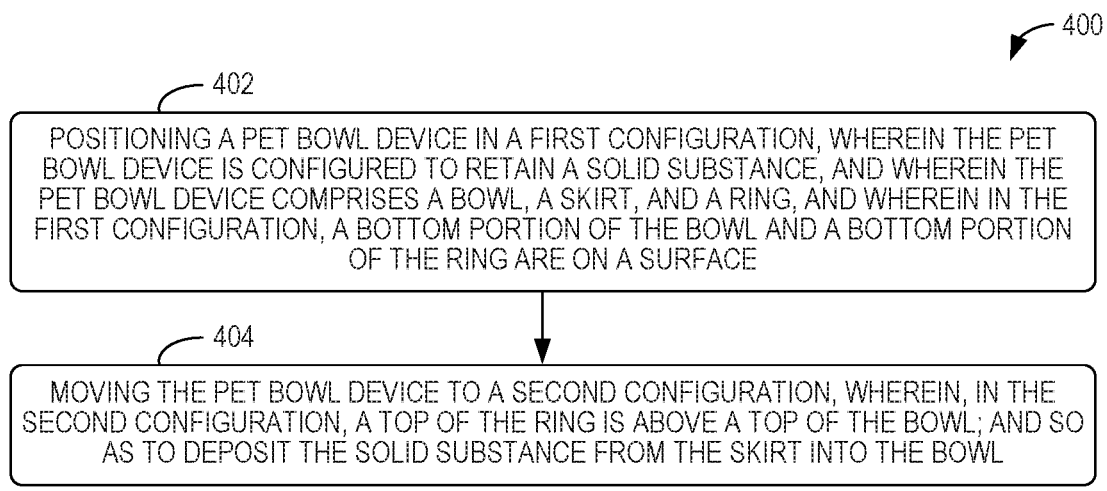
FIG. 4 is a flow chart of a method according to another embodiment of the disclosure.

FIG. 4 is a flow chart of a method 400 according to another embodiment of the disclosure. Each block or portions of each block in FIG. 4, and within other processes and methods disclosed herein, may be performed by or in accordance with the pet bowl device described above with respect to FIGS. 1A, 1B, 2, and 3. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Method 400 begins at block 402, which includes positioning a pet bowl device in a first configuration, wherein the pet bowl device is configured to retain a solid substance, and wherein the pet bowl device comprises a bowl, a skirt, and a ring, and wherein in the first configuration, a bottom portion of the bowl and a bottom portion of the ring are on a surface.

At block 404, method 400 involves moving the pet bowl device to a second configuration, wherein, in the second configuration, a top of the ring is above a top of the bowl; and so as to deposit the solid substance from the skirt into the bowl. In some embodiments, block 404 may additionally include depositing a liquid substance from the skirt into the bowl in examples where the skirt is configured to retain a liquid substance.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A pet bowl device, comprising:
    a bowl comprising:
        a base; and
        a wall comprising a lower portion adjacent to the base and an upper portion distal from the base, wherein a distance from a bottom of the base to a top of the upper portion defines a first height;
    a skirt configured to retain a solid substance, the skirt comprising:
        an inner edge attached to the upper portion of the bowl;
        an outer portion; and
        a central portion extending along a length between the inner edge and the outer portion, wherein the central portion is flexible, and wherein the length of the central portion is substantially greater than the first height of the bowl; and
    a ring coupled to the outer portion of the skirt, wherein the ring is shape retaining, and wherein the ring is a second height.

2. The device of claim 1, wherein the skirt comprises fabric.

3. The device of claim 1, wherein the inner edge comprises an elastic band, wherein the elastic band is attached to the upper portion of the bowl.

4. The device of claim 1, wherein the skirt is configured to retain a liquid substance.

5. The device of claim 1, wherein the ring comprises rubber.

6. The device of claim 1, wherein the ring comprises Styrofoam.

7. The device of claim 1, wherein the ring is rigid.

8. The device of claim 1, wherein the outer portion of the skirt comprises a sleeve, and wherein the ring envelopes the sleeve.

9. The device of claim 1, wherein each of the bowl, skirt and ring is formed of silicone, and wherein the bowl, the skirt, and the ring are integrally formed.

10. The device of claim 1, wherein each of the skirt and the ring comprises silicone, and wherein the skirt and the ring are integrally formed.

11. The device of claim 1, wherein the skirt each of the inner edge and the outer portion of the skirt are substantially circular.

12. The device of claim 1, wherein the ring is substantially circular.

13. The device of claim 1, wherein the ring is substantially rectangular.

14. A method comprising:
    positioning a pet bowl device in a first configuration, wherein the pet bowl device is configured to retain a solid substance, and wherein the pet bowl device comprises:
        a bowl comprising:
            a base; and
            a wall comprising a lower portion adjacent to the base and an upper portion distal from the base, wherein a distance from a bottom of the base to a top of upper portion defines a first height;
        a skirt configured to retain a solid substance, the skirt comprising:
            an inner edge attached to the upper portion of the bowl;
            an outer portion; and
            a central portion extending along a length between the inner edge and the outer portion, wherein the central portion is flexible, and wherein the length of the central portion is substantially greater than the first height of the bowl; and
        a ring coupled to the outer portion of the skirt, wherein the ring is shape retaining, and wherein the ring is a second height;
    and wherein in the first configuration, a bottom portion of the bowl and a bottom portion of the ring are on a surface; and
        moving the pet bowl device to a second configuration, wherein, in the second configuration, a top of the ring is above the top of the bowl; and so as to deposit the solid substance from the skirt into the bowl.

15. The method of claim 14, wherein the skirt is configured to retain a liquid substance and moving the pet bowl device to a second configuration comprises depositing the liquid substance from the skirt into the bowl.

16. A pet bowl clean up device comprising:
  a skirt configured to retain a solid substance, the skirt comprising:
    an inner edge configured to attach to an upper portion of a bowl;
    an outer portion; and
    a central portion extending along a length between the inner edge and the outer portion, wherein the central portion is flexible, and wherein the length of the central portion is substantially greater than a first height of the bowl; and
  a ring coupled to the outer portion of the skirt, wherein the ring is shape retaining, and wherein the ring is a second height.

17. The device of claim 16, wherein the skirt comprises fabric.

18. The device of claim 16, wherein the inner edge of the skirt comprises an elastic band, wherein the elastic band is attached to the upper portion of the bowl.

19. The device of claim 16, wherein each of the skirt and the ring are made of silicone and the skirt and the ring are integrally formed.

20. The device of claim 16, wherein the skirt is configured to retain a liquid substance.

* * * * *